United States Patent Office 3,595,702
Patented July 27, 1971

3,595,702
ACTIVE MASS FOR GALVANIC ELEMENTS AND PROCESS OF MAKING THE SAME
Winfried Krey, Neunheim, Aalen, Germany, assignor to Varta Gesellschaft mit beschränkter Haftung, Ellwangen (Jagst), Germany
No Drawing. Filed July 15, 1969, Ser. No. 842,094
Claims priority, application Germany, July 16, 1968, P 17 71 815.9
Int. Cl. H01m 15/06, 9/00
U.S. Cl. 136—137
14 Claims

ABSTRACT OF THE DISCLOSURE

An active depolarizer-electrolyte mass for primary cells is formed by distributing a polyelectrolyte in the carbon black- or graphite-containing depolarizer mass and then precipitating and cross-linking the polyelectrolyte by addition of polyvalent metal ions or hydrogen ions containing principal electrolyte. The composition permits setting up of the active mass without jeopardizing its consistency by too much or too little stirring, thus resulting in an improvement of the moldability into desired shapes of the mass.

BACKGROUND OF THE INVENTION

In more recent technology the use of an electrolyte consisting essentially of an aqueous zinc chloride solution has been more and more accepted, for instance when making primary cells. In this connection it has been proven advantageous, particularly in regard to capacity and heavy current discharge, to add to the depolarizer mass as large as possible an amount of so-called internal electrolyte solution.

However, with this practice there arose the problem that the time for wet mixing the active mass became highly critical. If the mass was stirred too little, the different components would not be mixed sufficiently; on the other hand, too thorough a mixing produced a mass which was no longer capable of receiving the electrolyte in a form such that it apparently looks like a substantially dry cell mass. Rather, a slurry was produced which could hardly be pressed into a definite form and which sticks to the die face of the pressing apparatus.

Another drawback that appeared was that in many molds there was provided a supply space for the active mass containing a stirring device in order to assure the constant feeding of the mass to the die. With this kind of device, it turned out that the mass, though it was passed into the supply space in a seemingly dry condition, would commence after a short time to flow to the die in the form of a slurry which could no longer be shaped since it either stuck to the die face or cannot at all be brought into a permanent shape. The only remedy in these cases has been to set up the mass with a fresh supply of active components.

It is therefore an object of the present invention to provide for a depolarizer-electrolyte mass which not only is capable of receiving a large amount of electrolyte but which does not depend in its consistency on a critical stirring time or stirring force.

SUMMARY OF THE INVENTION

This object is met by a process comprising the steps of adding a polyelectrolyte in the form of a non-cross-linked linear polymer preferably dissolved in water to a substantially dry carbon black- or graphite-containing depolarizer mass, mixing the two components together upon agitation, then adding, upon further agitation, a solution of a principal electrolyte containing metal ions or a second polyelectrolyte containing ion active groups, both adapted to act as cross-linking agents for said first polyelectrolyte and causing the precipitation of the said first polyelectrolyte.

The invention also embraces a substantially stirproof active depolarizer-electrolyte mass for use in primary cells comprising an oxide depolarizer composition, a conductivity agent distributed therein, a cross-linked polyelectrolyte finely distributed throughout said depolarizer composition and a principal electrolyte, the principal electrolyte constituting the cross-linking agent for said polyelectrolyte.

DESCRIPTION OF THE PREFERRED EMBODIMENTS

As described, the depolarizer mass preferably includes a carbon black-, acetylene black- or graphite conductivity agent.

The mass is preferably formed by adding the polyelectrolyte in solution to the dry or in undissolved form to the wetted carbon black or similar conductivity agent-containing mass. Only after the polyelectrolyte has been uniformly distributed throughout the depolarizer mass by conventional mixing means, is there then added the principal electrolyte which contains for instance polyvalent ions which will cause the polyelectrolyte to cross-link and become precipitated.

The polyvalent ions may be cations such as metal ions. The ions may also be furnished by another polyelectrolyte with opposite ion charge. Likewise, hydrogen ions may be used to effect the precipitation of the polyelectrolyte.

As appears from this method of proceeding, the polyelectrolyte, that is the first polyelectrolyte if there are two polyelectrolytes used in the process, at the time of addition is in non-cross-linked condition. It is cross-linked only subsequently by suitable precipitation agents such as the principal electrolyte containing metal ions or a second polyelectrolyte with opposite ion charge.

For instance, the depolarizer mass may be thoroughly mixed with an aqueous ammonium polyacrylate solution. Thereafter, an aqueous zinc chloride solution may be added which at the same performs the function of an internal electrolyte and a precipitation agent for the polyacrylate.

It is also possible to add univalent metal ions such as alkali and ammonium ions. These may be added to the depolarizer mass together with the polyelectrolyte without causing a precipitate.

The depolarizer mass formed in accordance with the invention is a compact, self-supporting mass which, in spite of exceeding the usual mixing times, will still have a consistency permitting shaping in any desired molds without difficulty.

As for the amount of the polyelectrolyte, it should be between 0.2 and 2 wt. percent of the dry mass. Thus, an amount as small as 0.2 wt. percent may be satisfactory while there is no obstacle to using substantially larger amounts. The original linear polyelectrolyte in the final mass will then be a cross-linked precipitated compound which acts as the solidifying agent for the mass.

The following may be an explanation of the very surprising and entirely unexpected effect of the precipitation of the polyelectrolytes:

Depolarizer masses contain oxides and, for the purpose of increasing the conductivity, more or less large amounts of carbon black or similar material. It is believed that the long chains of the originally linear polyelectrolyte are firmly adsorbed by these oxides or conductivity agents. The subsequent addition of the principal electrolyte then results in a cross-linking of the adsorbed polyelectrolyte chain by the polyvalent cations of the principal electrolyte, preferably zinc, alkaline-earth metals or aluminum ions. Thus, in the end, there is obtained a multidimensional cross-linked structure which has a high degree of self-support.

For this reason, polyelectrolytes which include in their chain or as substituents aromatic rings and which therefore are subject to particularly strong adsorption are the preferred polyelectrolytes.

If the active ion groups of the polyelectrolyte are carboxylate groups, the ions particularly preferred are, apart from zinc ions, alkaline-earth metal ions, aluminum ions and hydrogen ions.

For polyelectrolytes with sulfonate groups, it is possible to use also polyethyleneimine as precipitation agent.

As indicated, the final mass is highly compact and adapted for easy pressing and shaping and does not result in any sticking to the die faces. In addition it has excellent discharge properties. The latter are primarily due to tthe very good electrolyte distribution which results in an improved ion conductivity.

The polyelectrolyte in addition causes the wetting properties of the active mass to increase at the commencement of the mixing proceure which, in turn, results in a shortening of the wet mixing time.

It is important to note that with the depolarizer mass of the invention even overextended wet mixing periods are hardly critical in view of the addition of the polyelectrolyte.

The following is an exampe of the invention.

A mass was set up from the following components:

87 wt. parts of manganese dioxide;
13 wt. parts of acetylene black;
40 wt. parts of a 2% aqueous solution of amide groups containing ammonium polyacrylate.

These components were thoroughly mixed until no dusting of the mass occurred. Thereafter, 40 wt. parts of a 70% zinc chloride solution were added and the mixing was continued until all components had been uniformly distributed.

In all these cases it appears that the filamentary molecules of the polyelectrolyte are cross-linked by multivalent cations. The cations form part of the principal electrolyte. However, it is also possible to add a second polyelectrolyte of opposite ion charge and, likewise, hydrogen ions may also be used.

List and formulas of preferred polyelectrolytes
(1) Ammonium polyacrylate

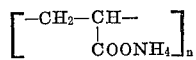

(2) Amide groups containing ammonium polyacrylate

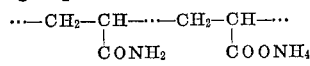

(3) Sodium polystyrene sulfonate

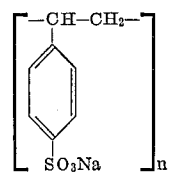

(4) Polyethyleneimine

$n = 50-50,000$ preferably $500-20,000$.

What is claimed is:
1. A process of making a depolarizer-electrolyte mass for primary cells adapted for being set up within a wide range of stirring and mixing times and mixing force, the said process comprising the steps of adding a polyelectrolyte in the form of a non-cross-linked linear polymer to a conductivity agent containing depolarizer mass, mixing the two components together upon agitation, then adding, upon furhter agitation, a solution of a principal electrolyte containing ions adapted to act as cross-linking agents for said polyelectrolyte and causing the said ions in the principal electrolyte to cross-link and precipitate the said first polyelectrolyte.

2. The process of claim 1, wherein the principal electrolyte is an aqueous solution of a compound furnishing zinc, magnesium or aluminum metal ions.

3. The process of claim 1, wherein the polyelectrolyte is an aqueous solution of an amide group containing non-cross-linked ammonium polyacrylate.

4. The process of claim 1, wherein the principal electrolyte is an aqueous zinc chloride solution.

5. The process of claim 1, wherein the polyelectrolyte is a non-cross-linked polystyrene sulfonate.

6. The process of claim 1, wherein the polyelectrolyte is added to the dry depolarizer mass containing the conductivity agent in an amount between 0.2 and 2% by weight.

7. The process of claim 1, wherein the said ions in the principal electrolyte are polyions of a second polyelectrolyte which polyions are of opposite polarity to the polyions of the first polyelectrolyte.

8. The process of claim 7, wherein the second polyelectrolyte is a polyethyleneimine.

9. A stir-proof active depolarizer-electrolyte mass for use in primary cells comprising an oxide depolarizer composition, a conductivity agent distributed therein, a cross-linked polyelectrolyte finely distributed throughout said depolarizer composition and a principal electrolyte, the principal electrolyte comprising the cross-linking agent of said polyelectrolyte.

10. The depolarizer-electrolyte mass of claim 9 wherein the polyelectrolyte is a polyacrylate or polystyrene sulfonate.

11. The depolarizer-electrolyte mass of claim 9, wherein the cross-linking agent is a polyvalent metal ion furnished by the principal electrolyte.

12. The depolarizer-electrolyte mass of claim 9, wherein the polyelectrolyte is an amide group-containing ammonium polyacrylate and the principal electrolyte is zinc chloride solution.

13. The depolarizer-electrolyte mass of claim 9, wherein the depolarizer is manganese dioxide.

14. The depolarizer-electrolyte mass of claim 9, wherein tthe conductivity agent is carbon black, acetylene black or graphite.

References Cited
UNITED STATES PATENTS

| | | | |
|---|---|---|---|
| 3,257,242 | 6/1966 | Euler et al. | 136—138X |
| 3,306,781 | 2/1967 | Siller | 136—138 |

DONALD L. WALTON, Primary Examiner

U.S. Cl. X.R.

136—138, 139, 157